United States Patent
Feldman et al.

(10) Patent No.: US 11,122,934 B2
(45) Date of Patent: *Sep. 21, 2021

(54) HEATING ELEMENT FOR A COOKING APPLIANCE

(71) Applicant: Revolution Cooking, LLC, Potomac, MD (US)

(72) Inventors: Benjamin F. Feldman, Reston, VA (US); Joseph D. Ellena, Herndon, VA (US); Thomas Musman, Woodbridge, VA (US); Noah Bergel, Lovettsville, VA (US); Aurelio Reyes, Mount Dora, FL (US); Richard Simmers, Boxford, MA (US); Pat Lollar, Cookeville, TN (US); David Hull, Cookeville, TN (US)

(73) Assignee: Revolution Cooking, LLC, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,234

(22) Filed: Oct. 21, 2020

(65) Prior Publication Data

US 2021/0030205 A1 Feb. 4, 2021

Related U.S. Application Data

(63) Continuation of application No. 15/863,782, filed on Jan. 5, 2018, now Pat. No. 10,842,318.

(Continued)

(51) Int. Cl.
*A47J 37/08* (2006.01)
*A47J 36/32* (2006.01)
(Continued)

(52) U.S. Cl.
CPC ......... *A47J 37/0807* (2013.01); *A47J 27/004* (2013.01); *A47J 36/321* (2018.08);
(Continued)

(58) Field of Classification Search
CPC ...... A47J 37/0807; A47J 37/08; A47J 36/321; A47J 27/004; A47J 37/0629; F24C 7/067;
(Continued)

(56) References Cited

U.S. PATENT DOCUMENTS 2,522,542 A  9/1950 Schaefer
3,651,304 A  3/1972 Fedor
(Continued)

FOREIGN PATENT DOCUMENTS

GB  329711 A  5/1930
GB  1166528 A  10/1969
(Continued)

OTHER PUBLICATIONS

International Search Report and Written Opinion for International Application No. PCT/US2018/012711 dated Apr. 23, 2018.
(Continued)

*Primary Examiner* — David J Walczak
(74) *Attorney, Agent, or Firm* — Wolf, Greenfield & Sacks, P.C.

(57) ABSTRACT

A heating element for a cooking appliance includes terminals that act as electrically conductive contact points. One or more buses are arranged between the terminals, and connect one or more heating element segments in a zig-zag configuration. The heating element segments are connected in series and are arranged parallel with one another. Each heating element segment includes a plurality of cutouts linked together and having an elliptical shape. The terminals, heating element segments, and buses are a continuous single sheet of conductive material. A method of making the heating element includes forming a pattern into the sheet of conductive material by etching the pattern into the conductive sheet using photolithography.

26 Claims, 12 Drawing Sheets

Related U.S. Application Data

(60) Provisional application No. 62/524,583, filed on Jun. 25, 2017, provisional application No. 62/443,548, filed on Jan. 6, 2017.

(51) Int. Cl.
| | | |
|---|---|---|
| *A47J 27/00* | (2006.01) | |
| *A47J 37/06* | (2006.01) | |
| *H05B 6/64* | (2006.01) | |
| *H05B 3/12* | (2006.01) | |
| *F24C 7/06* | (2006.01) | |
| *F24C 7/04* | (2021.01) | |
| *H01C 17/00* | (2006.01) | |
| *H01C 17/28* | (2006.01) | |
| *H05B 3/24* | (2006.01) | |
| *H05B 3/03* | (2006.01) | |
| *H05B 3/06* | (2006.01) | |
| *H05B 3/26* | (2006.01) | |

(52) U.S. Cl.
CPC ........... *A47J 37/0629* (2013.01); *A47J 37/08* (2013.01); *F24C 7/04* (2013.01); *F24C 7/043* (2013.01); *F24C 7/067* (2013.01); *H01C 17/003* (2013.01); *H01C 17/28* (2013.01); *H05B 3/03* (2013.01); *H05B 3/06* (2013.01); *H05B 3/12* (2013.01); *H05B 3/24* (2013.01); *H05B 3/26* (2013.01); *H05B 6/6482* (2013.01); *H05B 2203/003* (2013.01); *H05B 2203/004* (2013.01); *H05B 2203/007* (2013.01); *H05B 2203/011* (2013.01); *H05B 2203/013* (2013.01); *H05B 2203/032* (2013.01); *H05B 2203/035* (2013.01)

(58) Field of Classification Search
CPC . F24C 7/043; F24C 7/06; F24C 7/065; H05B 3/12; H05B 3/10; H05B 6/6482; H05B 3/24; H05B 3/03; H05B 3/06; H05B 3/26; H05B 2203/003; H05B 2203/011; H05B 2203/013; H05B 2203/004; H05B 2203/007; H05B 2203/032; H05B 2203/035; H01H 17/003; H01H 17/28

See application file for complete search history.

(56) References Cited

U.S. PATENT DOCUMENTS

| | | | |
|---|---|---|---|
| 3,798,417 A | 3/1974 | Bittner | |
| 3,798,419 A | 3/1974 | Maake | |
| 3,835,435 A | 9/1974 | Seel | |
| 3,852,568 A | 12/1974 | Clement | |
| 3,860,789 A | 1/1975 | Maake | |
| 3,898,426 A | 8/1975 | Maake | |
| 3,991,298 A | 11/1976 | Maake | |
| 4,034,206 A | 7/1977 | Penrod | |
| 4,151,398 A | 4/1979 | Maake | |
| 4,292,504 A | 9/1981 | Gebarowski et al. | |
| 4,346,651 A | 8/1982 | Schickedanz | |
| 4,718,332 A | 1/1988 | Möthrath | |
| 4,748,308 A | 5/1988 | Drews | |
| 6,730,888 B1 * | 5/2004 | Battu | A47J 37/085 219/502 |
| 7,211,772 B2 | 5/2007 | Carpino, II et al. | |
| 7,763,833 B2 | 7/2010 | Hindel et al. | |
| 8,126,319 B2 | 2/2012 | De Luca | |
| 8,145,548 B2 | 3/2012 | De Luca | |
| 8,498,526 B2 | 7/2013 | De Luca | |
| 8,669,500 B2 | 3/2014 | Hensel et al. | |
| 8,731,385 B2 | 5/2014 | De Luca | |
| 8,820,223 B2 * | 9/2014 | Lazzer | A47J 37/0807 99/401 |
| 8,878,106 B2 | 11/2014 | Hensel et al. | |
| 9,206,987 B2 | 12/2015 | De Luca | |
| 9,500,374 B2 | 11/2016 | De Luca | |
| 10,842,318 B2 | 11/2020 | Feldman et al. | |
| D911,038 S * | 2/2021 | Sajic | D5/2 |
| 2002/0075354 A1 | 6/2002 | Andrews et al. | |
| 2006/0278631 A1 | 12/2006 | Lee et al. | |
| 2007/0164015 A1 | 7/2007 | Carpino, II et al. | |
| 2008/0037965 A1 | 2/2008 | De Luca | |
| 2009/0064869 A1 | 3/2009 | Shealy et al. | |
| 2009/0139409 A1 | 6/2009 | Hall et al. | |
| 2009/0188904 A1 | 7/2009 | Schwerer et al. | |
| 2010/0166397 A1 | 7/2010 | De Luca | |
| 2011/0315672 A1 | 12/2011 | Benda et al. | |
| 2013/0105470 A1 | 5/2013 | De Luca | |
| 2015/0230658 A1 | 8/2015 | De Luca et al. | |
| 2015/0334775 A1 | 11/2015 | De Luca | |
| 2016/0120362 A1 | 5/2016 | Fields et al. | |
| 2019/0008322 A1 | 1/2019 | Feldman et al. | |

FOREIGN PATENT DOCUMENTS

| | | |
|---|---|---|
| GB | 1490684 A | 11/1977 |
| JP | 2011-040169 A | 2/2011 |
| WO | WO 2016/115215 A1 | 7/2016 |

OTHER PUBLICATIONS

No Author Listed, Mirror Heat Brochure. Tutco Inc. 4 pages. (Last accessed Dec. 20, 2017).

No Author Listed, 1Cr15A15. Shanghai Tankii Alloy Material Co., Ltd. 2 pages. (Last accessed Dec. 13, 2017).

* cited by examiner

HEATING ELEMENT FOR A COOKING APPLIANCE

CROSS-REFERENCE TO RELATED APPLICATIONS

This application is a Continuation of U.S. application Ser. No. 15/863,782 (now U.S. Pat. No. 10,842,318), filed Jan. 5, 2018, entitled "HEATING ELEMENT FOR A COOKING APPLIANCE", which claims priority to U.S. Provisional Patent Application No. 62/443,548, filed Jan. 6, 2017, and U.S. Provisional Patent Application No. 62/524,583, filed Jun. 25, 2017, the disclosures of which are hereby incorporated by reference in their entirety.

BACKGROUND

Various appliances are available for heating and cooking food. An oven, for example, is often used for cooking food at lower to moderate temperatures for fairly long periods of time. A microwave oven, on the other hand, utilizes microwave energy and can heat and cook food more rapidly, but the quality of food cooked in a microwave is often undesirable. Toasters and toaster ovens similarly suffer from certain drawbacks, such as slow cooking times and/or poor cooked food quality. Therefore, there is a need for improved cooking appliances that overcome the drawbacks of the prior art.

SUMMARY

In general terms, this disclosure is directed to a heating element for a cooking appliance. In some embodiments, and by non-limiting example, the heating element includes a plurality of conductive strips that generate infrared radiation. The infrared radiation provides faster cooking times and results in improved cooked food quality.

In one aspect, the disclosed technology relates to a heating element for a cooking appliance, the heating element comprising: first and second terminals; and one or more heating element segments extending between the first and second terminals, each heating element segment having a plurality of cutouts arranged in a repeating pattern, each cutout having an elliptical shape. The first and second terminals and the one or more heating element segments are a continuous single sheet of material.

In one example, the heating element includes one or more buses arranged between the first and second terminals, the one or more buses connecting the one or more heating element segments in a zig-zag configuration. In another example, the heating element includes a first set of heating element segments having a first length, a second set of heating element segments having a second length, and a third set of heating element segments having a third length. In some examples, the third set of heating element segments are arranged between the first and second sets of heating element segments, and the first length is less than the second length, and the second length is less than the third length. In some examples, the length of the first set of heating elements is about 70% to about 90% the length of the third set of heating elements, and the length of the second set of heating elements is about 80% to about 99% the length of the third set of heating elements. In some examples, the first length, second length, and third length define an optimized heating surface area that reduces energy waste.

In one aspect, the one or more heating element segments are connected in series and are arranged parallel to each other. In another aspect, the heating element has a total width greater than a sum of widths of the one or more heating element segments. In some examples, the total width of the heating element is about 35% to about 45% greater than the sum of widths of the one or more heating element segments.

In some examples, each cutout is defined by first and second walls that are curved and that flare out in opposing directions along a vertical axis. In some examples, each cutout is adjacent to an opposing first or second wall of an adjacent cutout.

In one aspect, the heating element generates infrared radiation when a voltage is applied across the heating element. In one aspect, the heating element is included in a toaster.

In another aspect, the disclosed technology relates to a cooking appliance comprising: a housing defining at least one cooking cavity for receiving food therein; an electrical power cable including electrical conductors, configured for connection to a mains power source; and a heating assembly arranged to provide infrared radiation into the cooking cavity, the heating assembly being directly electrically connected to the electrical conductors of the electrical power cable, the heating assembly including at least one heating element that includes: first and second terminals; and one or more heating element segments extending between the first and second terminals, each heating element segment includes a plurality of cutouts linked together, each cutout having an elliptical shape; wherein the first and second terminals and the one or more heating element segments are a continuous single sheet of material.

In some examples, the at least one heating element further includes one or more buses arranged between the first and second terminals, the one or more buses connecting the one or more heating element segments in a zig-zag configuration. In one aspect, the at least one heating element includes a first set of heating elements having a first length, a second set of heating element segments having a second length, and a third set of heating element segments having a third length; the third set of heating element segments are arranged between the first and second sets of heating element segments, and wherein first length is less than the second length, and the second length is less than the third length. In some examples, the first length, second length, and third length define an optimized heating surface area that reduces energy waste by limiting heat from being applied to spaces in the at least one cooking cavity that are not proximate to food.

In some examples, each cutout in the at least one heating element is defined by first and second walls that are curved and that flare out in opposing directions along a vertical axis.

In one aspect, the cooking appliance is a toaster having parallel cooking cavities; and wherein heating elements are mounted adjacent to opposing sides in each cooking cavity.

In another aspect, the disclosed technology relates to a method of making a heating element, the method comprising: obtaining a single sheet of conductive material; and forming a pattern into the sheet of conductive material; wherein the pattern defines one or more heating element segments connected together in series and extending between first and second terminals, each heating element segment includes a plurality of cutouts linked together, each cutout having an elliptical shape; and wherein each heating element segment includes a plurality of elliptically shaped cutouts spaced apart from one another in a chained or linked pattern.

In some examples, the step of forming a pattern comprises etching the pattern into the conductive sheet using photolithography.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
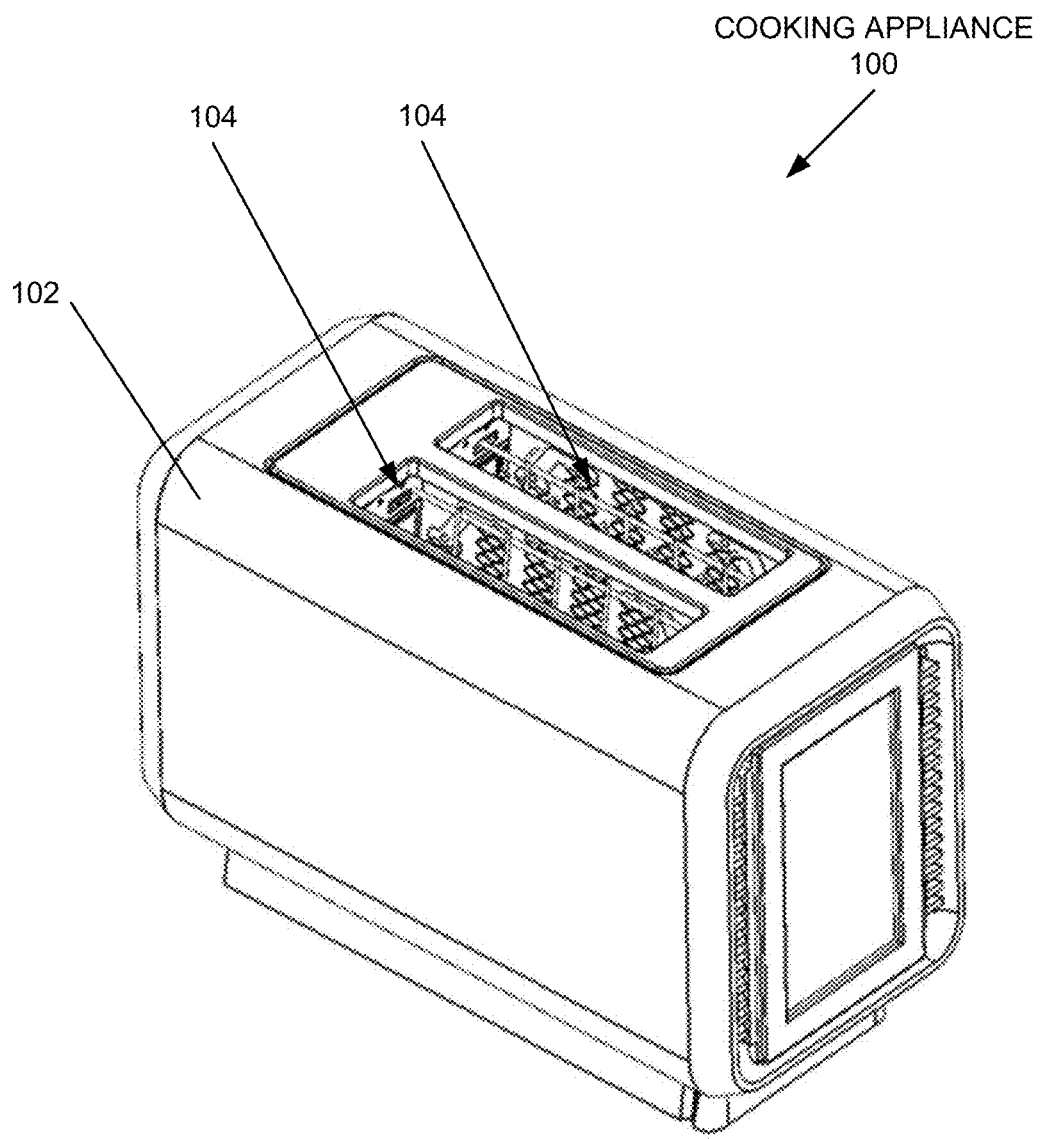
FIG. 1 is an isometric view of an example cooking appliance.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is an isometric view of an example cooking appliance 100. The cooking appliance 100 includes a housing 102 that defines one or more cooking cavities 104. In use, food is placed within one of the cooking cavities 104 where it is heated by the cooking appliance 100. The cooking appliance 100 operates to supply energy to food arranged within the one or more cooking cavities 104. The cooking appliance 100 can take a variety of forms, such as a toaster, a toaster oven (including, for example, a pizza oven), a microwave oven, an electric grill, a contact cooker (including, for example, a contact grill or griddle), or a slow cooker.

Figure 2:
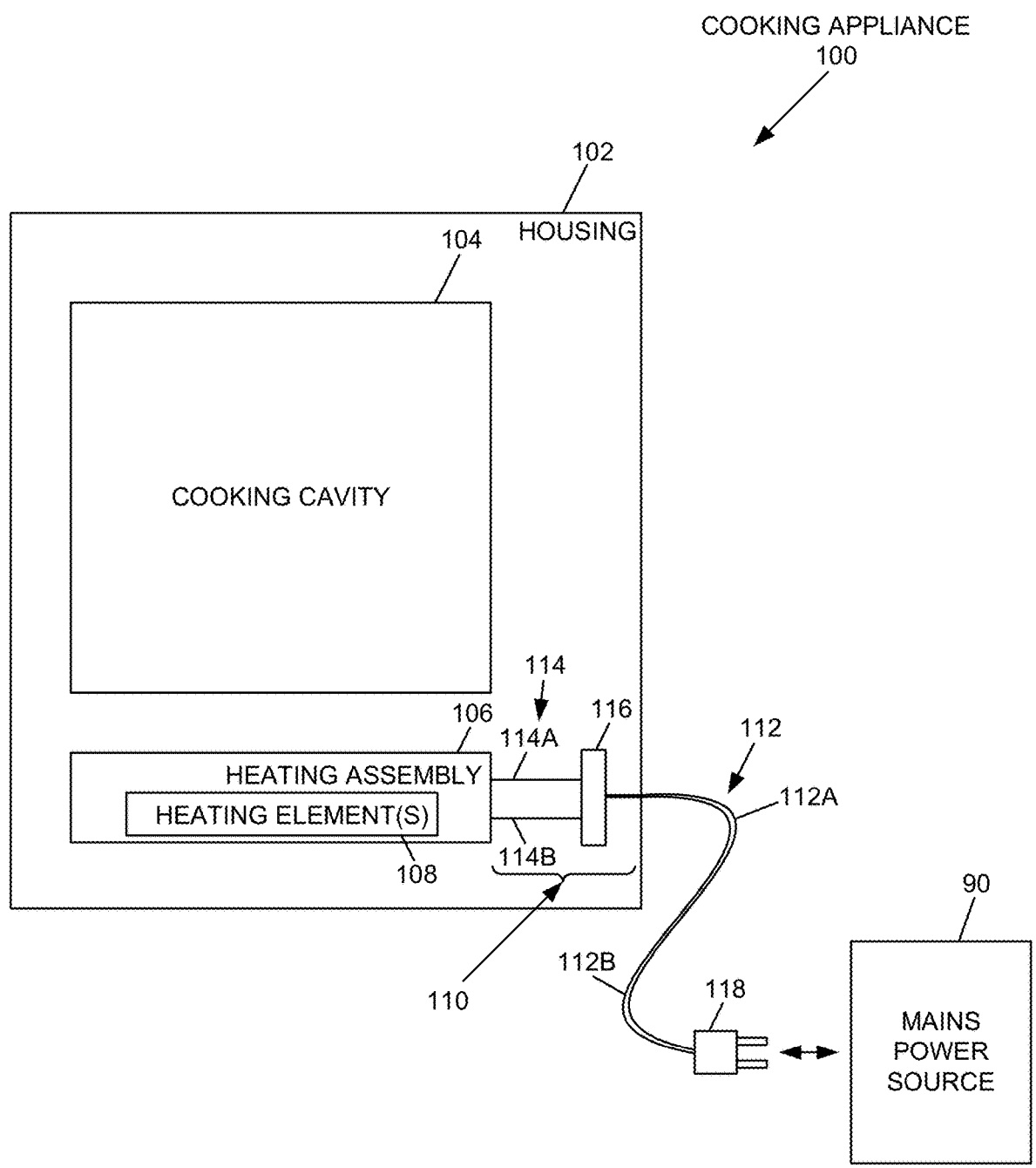
FIG. 2 is a schematic block diagram of the example cooking appliance.

FIG. 2 is a schematic block diagram of the cooking appliance 100 that includes a housing 102, a cooking cavity 104, a heating assembly 106 including at least one heating element 108, an electrical control and coupling 110, and a power cable 112. In certain examples, the electrical coupling and control 110 includes electrical conductors 114 (including conductors 114A and 114B) and a coupler 116. In some examples, the power cable 112 includes electrical conductors 112A and 112B and a plug 118. The cooking appliance 100 is powered by a power source, for example, by connecting the power cable 112 to a mains power source 90.

The cooking appliance 100 includes a heating assembly 106, which includes one or more heating elements 108. The heating elements 108 are electrically coupled to the power cable 112, such as through an electrical control and coupling 110, and can be electrically connected to a power source such as the mains power source 90. Examples of the heating assembly 106 are illustrated and described in further detail with reference to FIGS. 3 and 4.

In at least some examples, each heating element 108 is formed of a plurality of conductive strips. When powered, electricity flows through the heating element 108 generating heat. As the temperature of the heating element rises, the heating element 108 begins to generate infrared radiation. The heating element 108 continues to generate infrared radiation until the heating assembly is disconnected from the power source. The infrared radiation is directed to the cooking cavity 104 where it operates to heat food in the cooking cavity. Examples of the heating element 108 are illustrated and described in further detail with reference to FIGS. 3-5.

Certain examples include an electrical control and coupling 110 which includes conductors 114 and coupling 116. In some examples, the coupling 116 includes a switch or other control device for selectively coupling the heating assembly 106 to the power source 90 to turn on and off the heating assembly 106. In some examples, when the electrical control and coupling 110 has selectively coupled the heating assembly 106 to the power source 90, the heating assembly 106 is directly coupled to the power source through the conductors 114A and 114B and the conductors 112A and 112B of the power cable 112. In such examples, the cooking appliance 100 does not require a separate power supply including a voltage transformer or other power regulation electronics to supply the electricity from the mains power source 90 to the heating assembly-instead the electricity can be supplied directly through the conductors.

Figure 3:
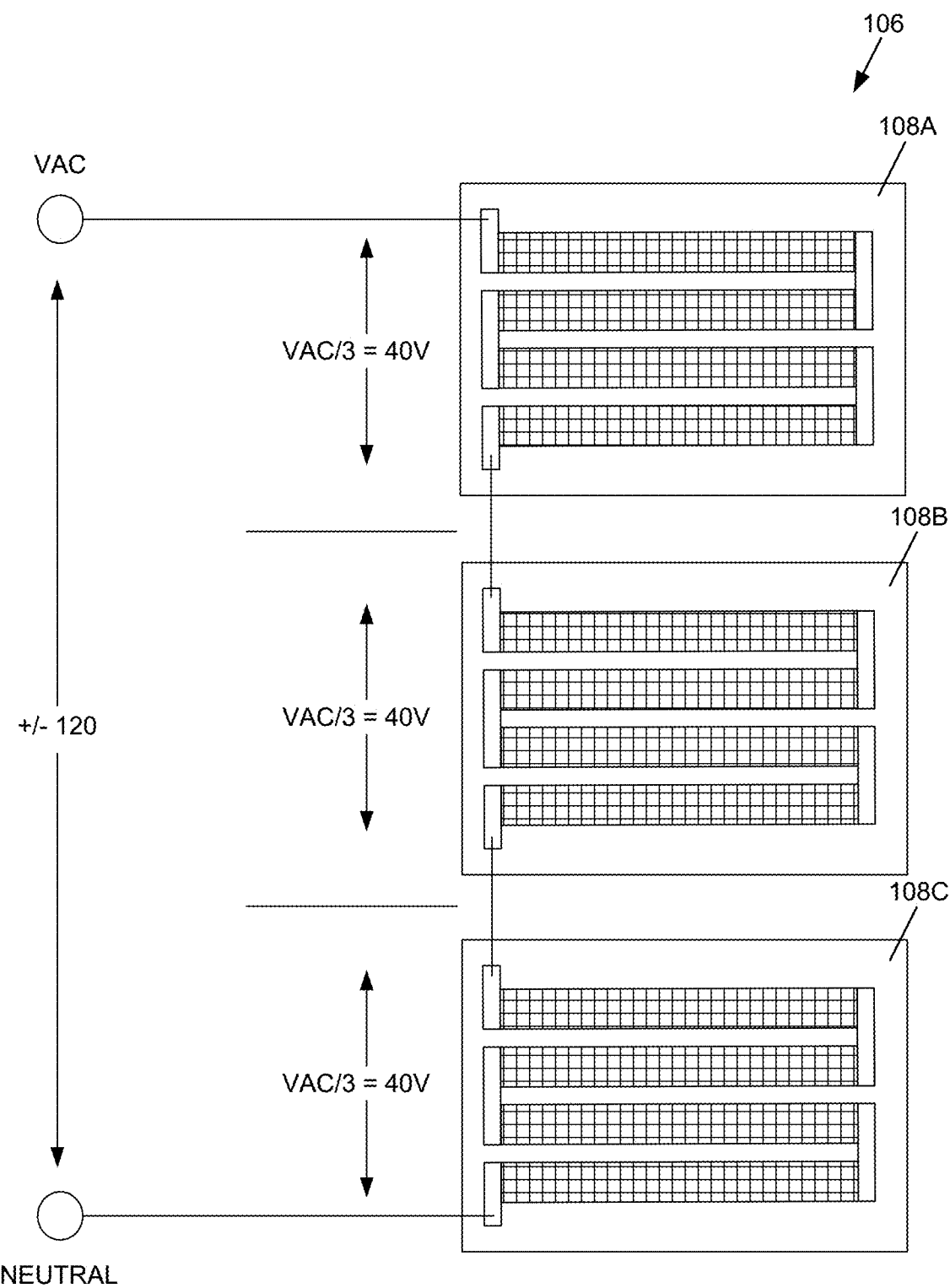
FIG. 3 is a schematic diagram illustrating an example heating assembly.
Figure 4:
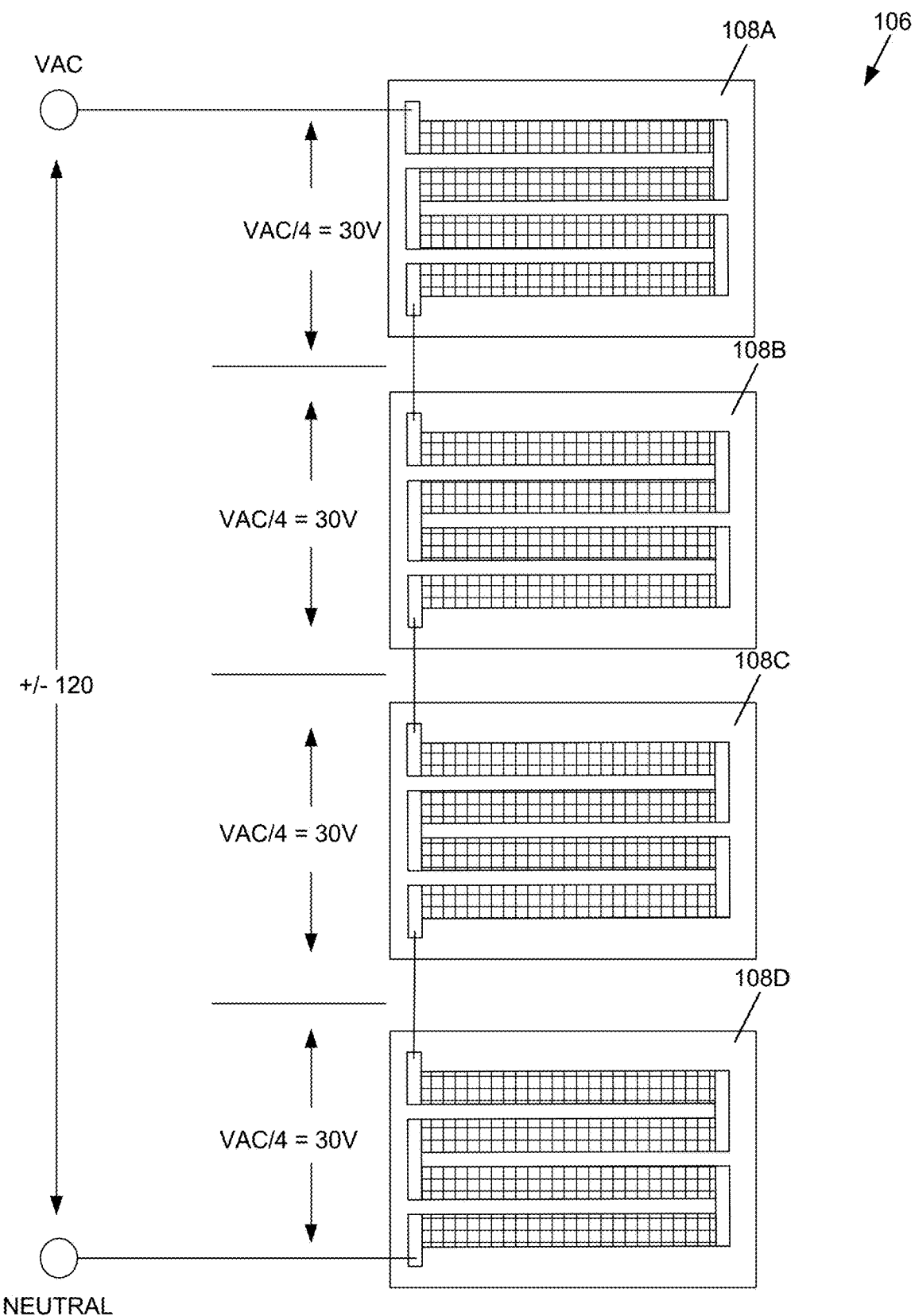
FIG. 4 is a schematic diagram illustrating another example heating assembly.

FIGS. 3 and 4 are schematic diagrams illustrating examples of the heating assembly 106. In the example shown in FIG. 3, the example heating assembly 106 includes three heating elements 108A, 108B, and 108C. The heating assembly 106 is selectively coupled to a power source, such as by a switch. The switch can be manually controlled by a user (e.g., by pressing down on a toaster, or by depressing a power button), or can be controlled by an electronic control system such as in a microwave oven. When coupled to the power source, the heating assembly 106 is energized. When directly coupled to a mains power source, the heating assembly 106 is energized by an alternating current signal. In North America, the alternating current signal typically has a voltage of +/−120 V and a frequency of 60 hertz. In other parts of the world, other signals (such as having different voltages) are used and the heating assembly 106 can be designed to work with any appropriate mains power source, or even a DC power source such as from a battery or utilizing a power inverter. In the example discussed herein, a voltage of +/−120 V is discussed for illustrative purposes.

In this example, the heating assembly 106 includes three heating elements 108A, 108B, and 108C arranged in series. The heating element 108A is connected at one end to the AC line of the mains power source, and is connected at the other end to an end of the heating element 108B. The ends of the heating element 108B are connected to ends of the heating elements 108A and 108C. One end of the heating element 108C is connected to the end of the heating element 108B and the other end of the heating element 108C is connected to the neutral line of the mains power source.

In this configuration, the heating elements 108A, 108B, and 108C act as a voltage divider to divide the +/−120 V signal across the three elements. In other words, each heating element sees a voltage across it of VAC/3 elements=VAC/3 or about 40 V.

In order to obtain a desired power output from each element 108, the heating elements 108 can be designed to have a desired resistance. For example, to obtain a power output of 500 watts from each element (1500 W total from three elements), the desired resistance is calculated by P=I*V, or 500 W=I*40 V. Therefore, the desired current is I=500 W/40 V=12.5 Amps. The resistance is then computed using V=I*R, or R=V/I=40 V/12.5 Amps=3.2 Ohms. The calculations can be adjusted to obtain other power outputs. These values can be used in the design of the heating elements as discussed in further detail herein.

In the example shown in FIG. 4, the example heating assembly 106 includes four heating elements 108A, 108B, 108C, and 108D. As in the example shown in FIG. 3, the heating elements 108 are arranged in series. Because there are now four heating elements, the mains voltage is now divided across four elements, resulting in a lower voltage across each element, e.g., 30 V. Therefore, in this example it may be desirable to adjust the particular configuration of the heating element in view of the decreased voltage.

The heating assembly 106 can have one or more heating elements, including for example, 2, 3, 4, 5, 6, 7, 8, 9, 10, or more. One benefit of having multiple heating elements is that the heating elements may be positioned in different locations within the cooking appliance 100. For example, in a toaster there may be one heating element positioned on each side of the cooking cavities so as to heat a slice of bread on each side. In a multi-slice toaster, additional heating elements can be used for each cooking cavity. As another example, a toaster oven or microwave can have heating elements arranged on the top and bottom of the cooking cavity such that radiative heating may be combined with one or more additional mechanisms such as free/forced convection and microwave. Other embodiments are also possible having various numbers of heating elements arranged in various possible configurations.

Figure 5:
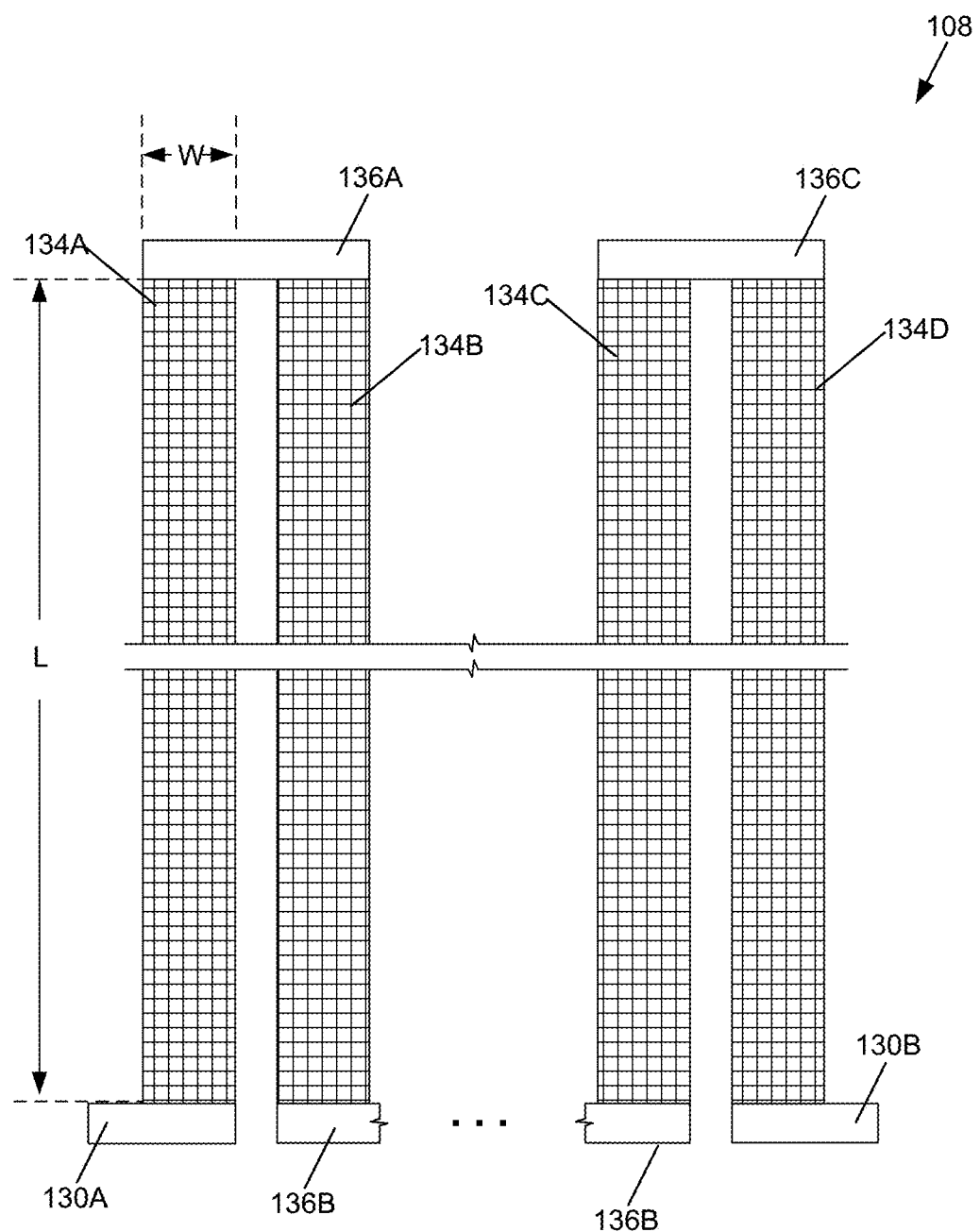
FIG. 5 is a schematic diagram illustrating an example of a heating element.

FIG. 5 is a schematic diagram illustrating an example of a heating element 108. In this example diagram, the heating element 108 includes terminals 130 (including 130A and 130B), heating element segments 134 (including 134A, 134B, 134C, and 134D), and buses 136 (including 136A, 136B, and 136C). In accordance with the present disclosure, the heating element 108 can include one or more heating element segments 134, and typically includes at least a plurality of heating element segments 134. The example shown in FIG. 5 illustrates four heating element segments 134, but also includes an ellipsis representing the fact that embodiments can have more or fewer heating element segments 134.

The heating element 108 includes terminals 130A and 130B arranged at each end. The terminals 130 are electrically conductive contact points to which the heating element 108 can be connected to a power source or other heating elements 108 (such as shown and described with reference to FIGS. 3 and 4). In this example the terminals 130A and 130B are also each connected to at least one heating element segment 134 of the heating element 108. For example, terminal 130A is connected at one end of heating element segment 134A and terminal 130B is connected at one end of heating element segment 134D.

The heating element segments 134 are the parts of the heating element 108 that heat up and generate infrared radiation when electricity is passed through them. In some embodiments the heating element segments 134 are formed of a conductive material. In one example, the conductive material is an alloy of at least nickel and chromium, also known as Nichrome.

The buses 136 are arranged to connect the heating element segments 134 in series. The buses 136 are electrically conductive strips that are connected at ends of adjacent heating element segments 134 and act to mechanically support the heating element segments 134, and also to conduct electricity between the adjacent heating element segments 134. In this example, bus 136A is connected to ends of heating element segments 134A and 134B; bus 136B is connected to ends of heating element segments 134B and 134C; and bus 136C is connected to ends of heating element segments 134C and 134D. In some embodiments as shown in FIG. 5, the heating element 108 has a zig-zag shape in which the heating element segments 134 and buses form a zig-zag shape that follows one heating element segment 134A to a bus 136A, which is then connected to another heating element segment 134B and a bus 136B, etc.

When energized, a voltage is applied across the terminals 130A and 130B, such as shown in FIGS. 3 and 4. When the heating element segments 134 are arranged in series as shown in FIG. 5, the heating element segments 134 act as a voltage divider to divide the total voltage applied across the heating element 108. When the heating element segments 134 have the same size and electrical characteristics, the voltage is evenly divided across each element. Therefore, if 40 V is applied to terminals 130A and 130B, and there are a total of four heating element segments 134, each heating element segment 134 has a voltage applied across it of the 10 V. If additional heating element segments 134 are present, the voltage is further divided.

With a given voltage being applied across a heating element segment, and a selected conductive strip material, the heating element segments can be designed to have a desired level of power output by adjusting the length L to width W ratio of the heating element. In order to decrease the power output (by decreasing the current flow), the ratio is increased so that the strip is longer and/or narrower. In order to increase the power output (by increasing the current flow), the ratio is decreased so that the strip is shorter and/or wider.

An advantage of some examples is that the heating assembly 106 can operate directly from the power supplied by the mains power source 90 (FIG. 2), without requiring complex and costly electronics to modify the power. For example, in some embodiments the heating assembly does not require a transformer or other voltage rectifier or inverter electronic circuitry in order to transform the power from an original form into another form suitable for the heating assembly 106. Instead, the heating assembly 106 can, in some embodiments, operate directly from the power supplied by the mains power source 90.

Figure 6:
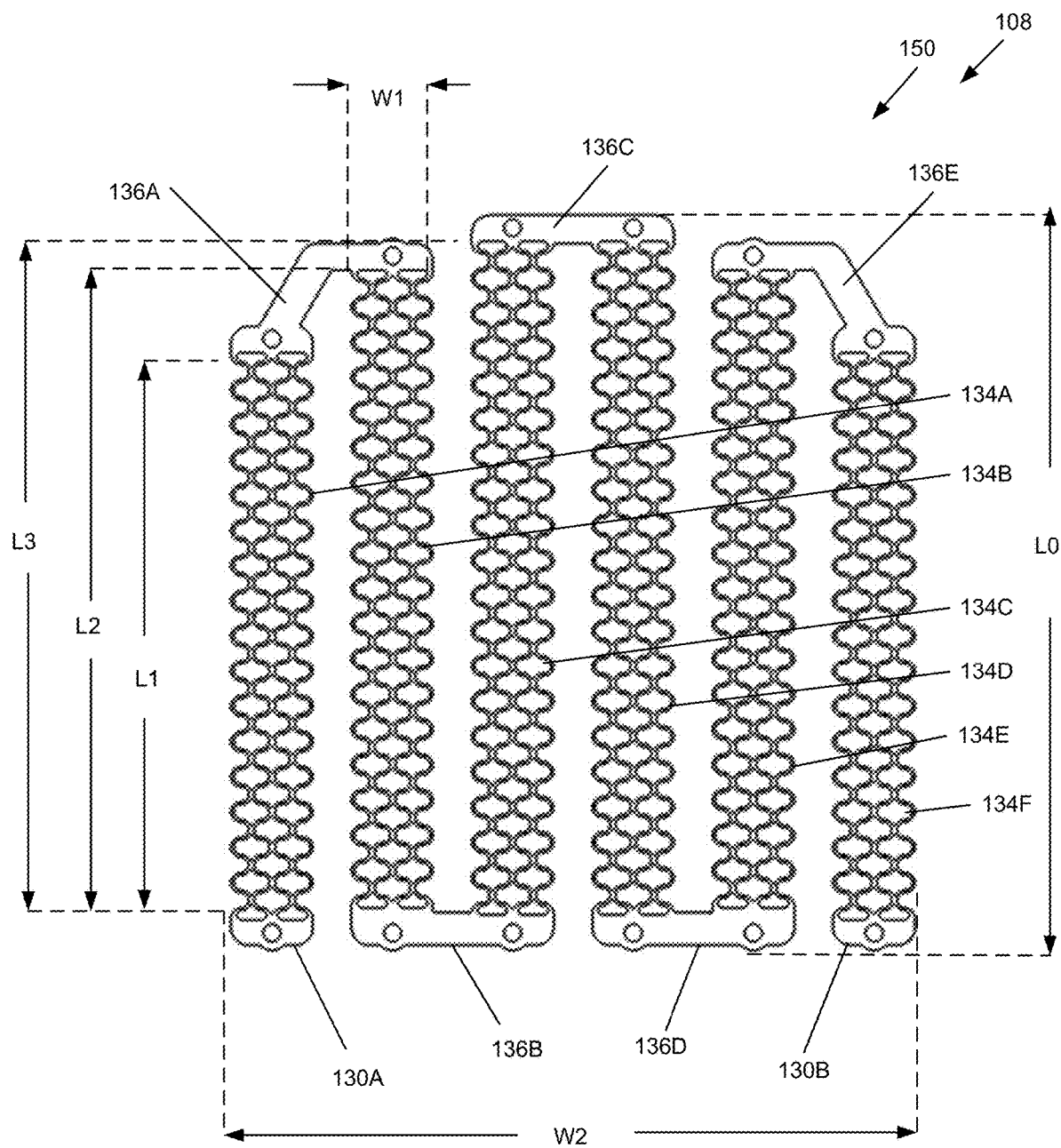
FIG. 6 is a front plan view of another example heating element.
Figure 7:
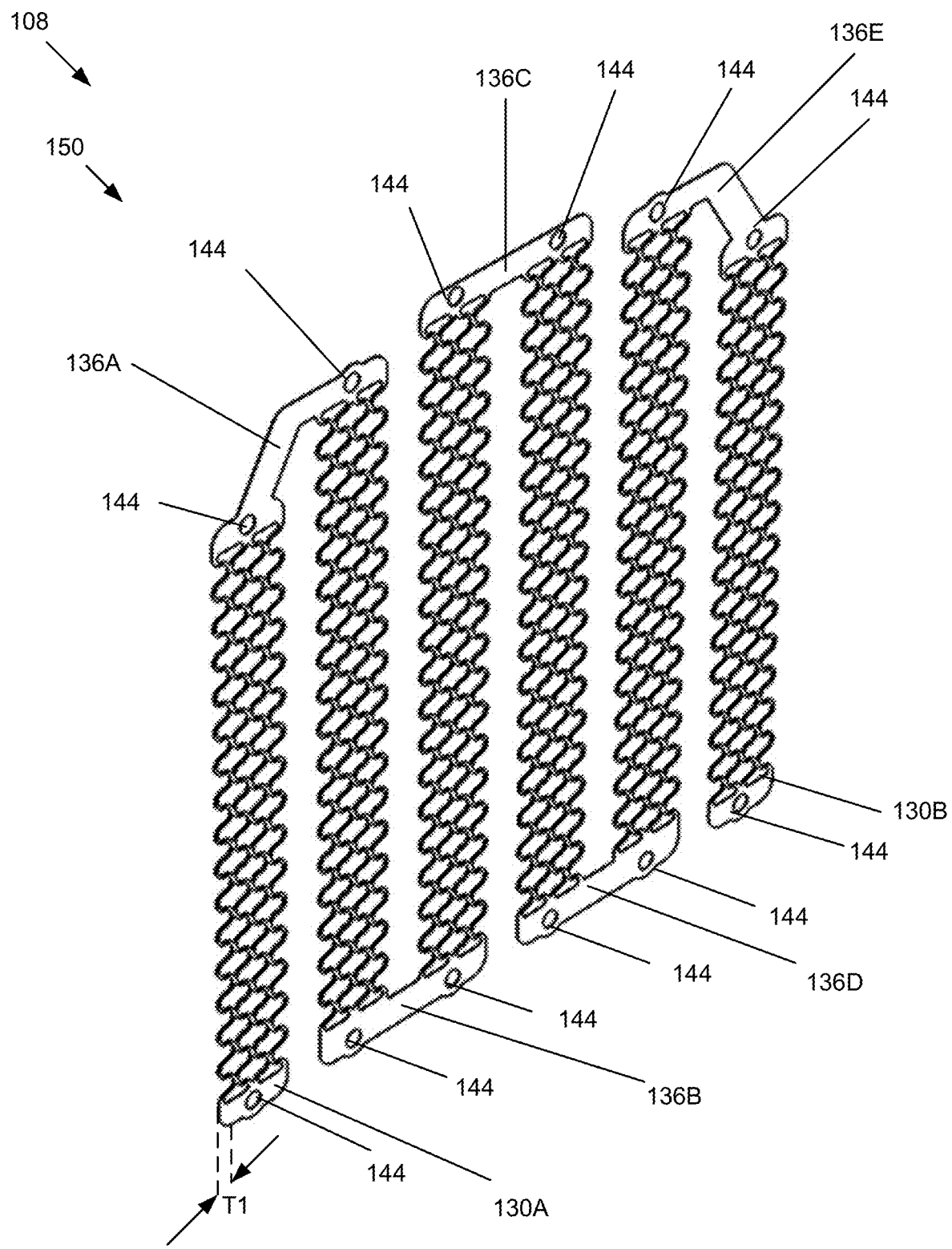
FIG. 7 is an isometric view of the example heating element shown in FIG. 5.

Referring now to FIGS. 6 and 7, an example heating element 150 includes terminals 130 (including terminals 130A and 130B), heating element segments 134 (including segments 134A-F), and buses 136 (including buses 136A-E). In the example depicted in FIGS. 6 and 7, the heating element 150 includes six heating element segments 134A-134F connected together by five buses 136A-136E, but in other examples the heating element 150 may include more or fewer heating element segments 134. Other examples may include a quantity of heating element segments 134 that range from about 1 to about 20, or from about 2 to about 12. Some examples may have an even number of heating element segments 134 such as 2, 4, 6, 8, 10, or 12 etc.

The heating element 150 has a total width W2 and each heating element segment 134 has a width W1. The total width W2 is greater than the sum of the widths W1 of each heating element segment 134 in the heating element 150. In certain examples, the total width W2 of the heating element is about 35% to about 45% greater than the sum of the widths W1 of the one or more heating element segments. In certain examples, the total width W2 of the heating element 150 is in a range from about 2 inches to about 18 inches, or in a range from about 3 inches to about 12 inches, or in a range from about 4 inches to about 6 inches.

The heating element 150 includes terminals 130A and 130B arranged at opposite ends of the heating element 150. The terminals 130 are electrically conductive contact points that connect the heating element 150 to a power source or other heating elements (such as shown and described with reference to FIGS. 3 and 4). In this example, the terminals 130A and 130B are also each connected to at least one heating element segment 134 of the heating element 150. For example, terminal 130A is connected at one end of heating element segment 134A and terminal 130B is connected at one end of heating element segment 134F.

The heating element segments 134 may be connected in series so that the current path between the terminals 130A, 130B is increased as compared to a surface area having only a single heating element segment 134. For example, the current path is at least six times the length L1 of the first heating element segment 134A. By increasing the current path between the terminals 130A, 130B, higher voltages may be employed by the power source (e.g., 110V that may be the same as the voltage source to which the appliance is plugged into) and/or lower current, which may be helpful in avoiding use of a power converter or otherwise reduce the cost of components of an appliance that includes the heating element 150.

In the example shown in FIGS. 6 and 7, the heating element 150 has a total length L0 and a first set of outermost heating element segments (e.g., segments 134A and 134F) have a first length L1, a second set of inner heating element segments (e.g., segments 134B and 134E) have a second length L2, and a third set of innermost heating element segments (e.g., segments 134C and 134D) have a third length L3. In the example depicted in FIGS. 6 and 7, three sets of heating element segments are depicted, and each set includes two heating element segments. In other examples, a set of heating element segments may include a single heating element segment or may include more than two heating element segments, and the heating element 150 may include more than or fewer than three sets of heating element segments.

The length of each heating element segment 134 (e.g., L1, L2, or L3) is greater than the width W1 of each heating element segment 134. The ratio of the lengths L1, L2, L3 to the width W1 can be selected in order to obtain a desired power output, current flow, and resistance. In some examples, the heating element segments 134 each have a width W1 in a range from about 0.1 inches to about 6 inches, or in a range from about ¼ inch to about 1 inch. In some examples, the width W1 is about ½ inch. In some examples, the lengths L1I-L3 of the heating element segments 134 may range from about 2 inches to about 12 inches, or may range from about 3 inches to about 8 inches. In certain examples, the length L1 of the first set of heating elements is about 70% to about 90% the length L3 of the third set of heating elements. In certain examples, the length L2 of the second set of heating elements is about 80% to about 99% the length L3 of the third set of heating elements.

In the example heating element 150 depicted in FIGS. 6 and 7, the bus 136A which connects heating element segments 134A and 134B has an elbow or bent shape for accommodating the different lengths L1, L2 between these heating element segments. The bus 136E which connects heating element segments 134E and 134F also has an elbow or bent shape for accommodating the different lengths L1, L2 between these heating element segments. Buses 136B, 136C, and 136D each have a straight or linear shape for connecting adjacent heating element segments (e.g., heating element segments 134B and 134C, heating element segments 134C and 134D, and heating element segments 134D and 134E). In certain examples, the shapes of the terminals 130 (e.g., terminals 130A-B) and the buses 136 (e.g., buses 136A-E) may vary.

The buses 136A-E and the terminals 130A, 130B each include one or more apertures 144 to provide mechanical contact points. In certain examples, electrically insulated mechanical supports are fastened to the apertures 144 to hold the terminals 130 and buses 136 in a desired position with respect to a cooking cavity of an appliance such as the cooking appliance 100. In some examples, the mechanical supports may include springs to support the heating element 150, which allows the heating element to expand and contract as it heats up and cools down.

During operation, electricity is supplied to the heating element 150 by electrically connecting the terminals 130A and 130B to the power source. As electricity flows through the heating element 150, the material of the heating element segments 134 begins to heat up and glow. Typically the glowing begins at temperatures between about 500 and 550 degrees C. (about 1,000 degrees F.). When the heating element segments 134 glow, they generate and radiate infrared radiation. In some embodiments the heating element segments 134 have a temperature in a range from about 800 to about 900° C. during operation, or about 850° C.

Figure 8:
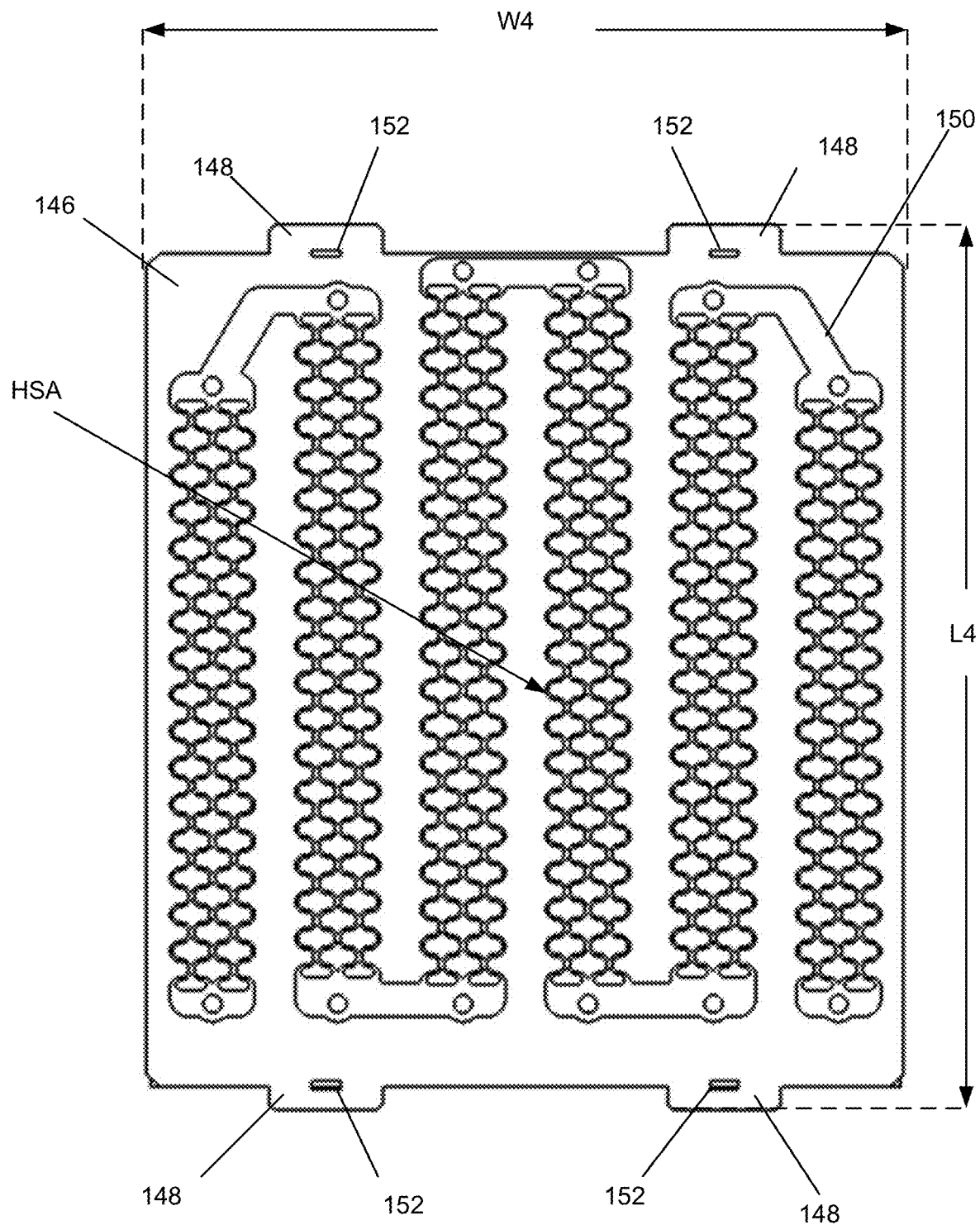
FIG. 8 is a front plan view of a reflector positioned behind the example heating element shown in FIG. 5.
Figure 9:
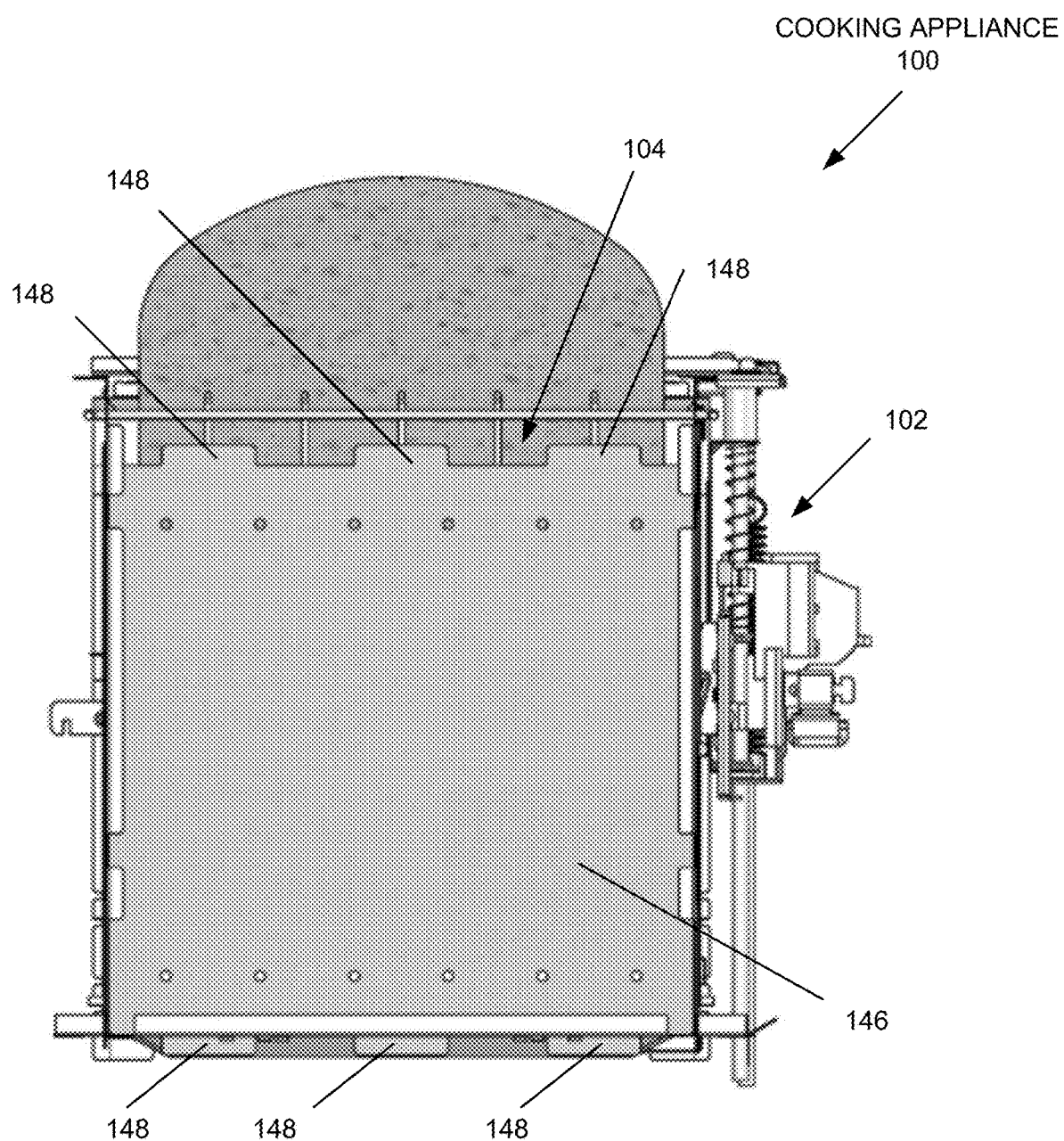
FIG. 9 is a side sectional view of a cooking appliance that includes the example heating element shown in FIG. 5.
Figure 10:
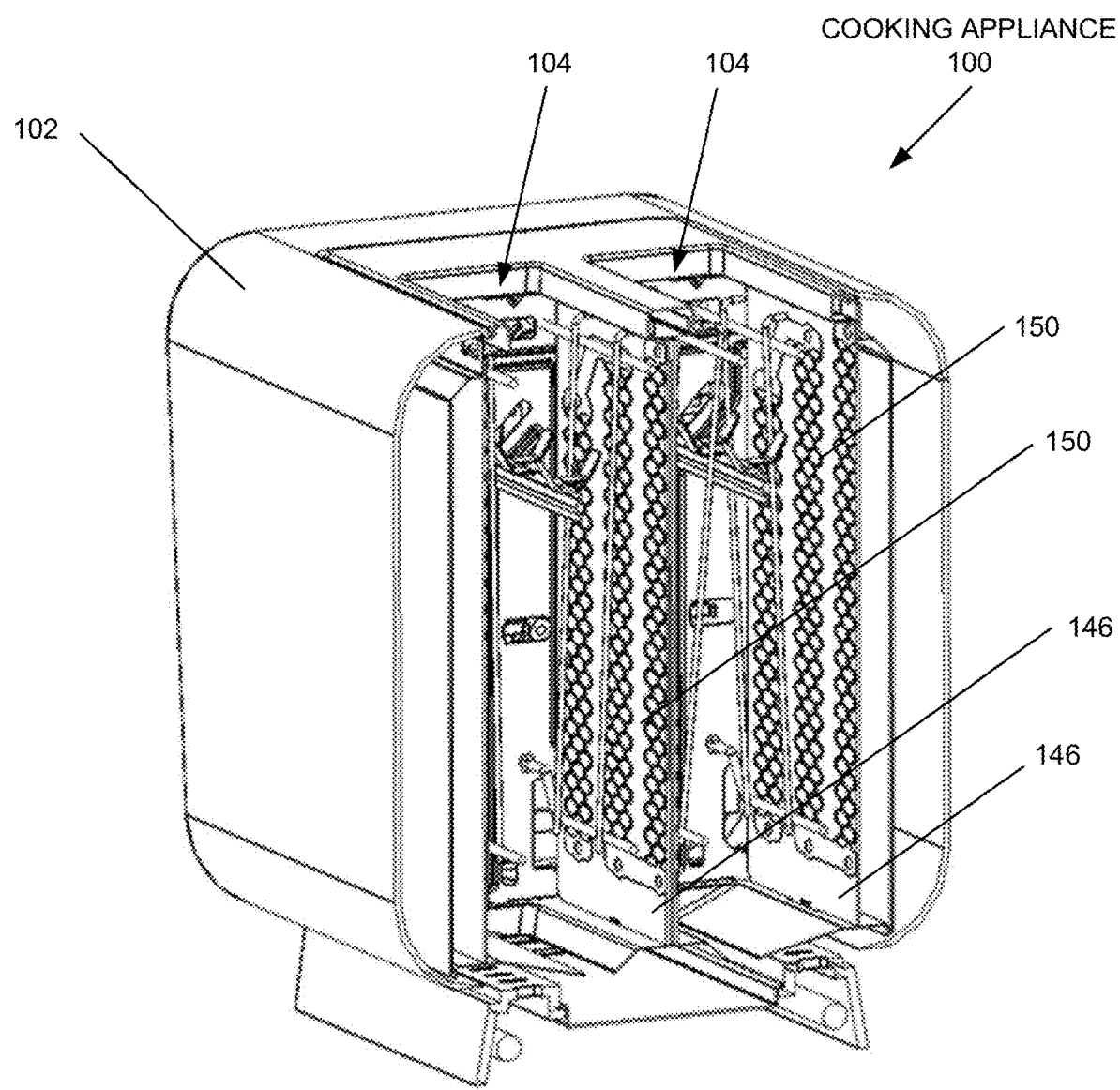
FIG. 10 is a front sectional view of a cooking appliance that includes the example heating element shown in FIG. 5.

Referring now to FIGS. 8-10, a reflector 146 may be positioned adjacent the heating element 150 when the heating element 150 is mounted inside a cooking appliance. In certain examples, rivets may be fastened through the apertures 144 for attaching the heating element 150 to the reflector 146 proximate to a cooking cavity 104 of the cooking appliance 100.

In the example depicted in FIG. 9, the cooking appliance 100 is a toaster having a slice of bread partially inserted in a cooking cavity 104 (e.g., bread slot). FIG. 10 depicts a front cross-sectional view of the cooking appliance 100 as having two cooking cavities 104 (e.g., bread slots), and a reflector 146 and heating element 150 are positioned on opposing sides in each cooking cavity 104. Accordingly, in the example of FIGS. 9 and 10, the cooking appliance 100 includes four reflectors 146 and four heating elements 150. Although the cooking appliance 100 in FIGS. 9 and 10 is depicted as a toaster having two cooking cavities 104 (e.g., bread slots), it is contemplated that the heating element 150 may be used in different types of cooking appliances including toaster ovens, pizza ovens, microwave ovens, electric grills, contact cookers (including, for example, contact grills or griddles), or slow cookers. Also, it is contemplated that the heating element 150 may be used in toasters having more than or fewer than two bread slots.

During operation of the heating element 150, the heating element segments 134 radiate infrared radiation in all directions. The reflector 146 reflects the heat generated by the heating element segments 134 back toward the heating element 150 and a cooking cavity 104 of the appliance 100 (such as a bread slot in a toaster cooking appliance). The reflected infrared radiation further helps to heat the heating element segments 134 allowing them to heat up more quickly and to generate additional infrared radiation. Additionally, the reflector 146 provides both thermal and electrical insulation in the cooking appliance 100 such that the heat and current of the heating element 150 does not transmit to the housing 102 of the cooking appliance 100.

The reflector 146 may include several tabs 148 along the top, bottom, and sides that anchor the reflector 146 inside the chassis of the cooking appliance 100. Additionally, each tab 148 may include an aperture 152 that can receive a fastener for securing the reflector 146 to the housing 102 of the cooking appliance 100. In FIG. 8, the reflector 146 is depicted as having a length L4 and a width W4. In certain examples, the length L4 may be about 5.5 to about 6.5 inches, and the width W4 may be about 4.5 to about 5.5 inches. The reflector 146 can be made from a sheet of dielectric material such as Phlogopite high temperature mica or similar materials. In certain examples, the reflector 146 may have a thickness of about 0.015 to about 0.045 inches.

Referring now to FIGS. 8-10, the arrangement of the heating element segments 134A-134F provides an optimized heating surface area $HS_A$ adjacent the reflector 146. The optimized heating surface area $HS_A$ is defined by the lengths L1-L3 of the heating element segments 134A-134F. In certain examples, the optimized heating surface area $HS_A$ may match the shape of a typical piece of toast having a square or rectangular bottom and a rounded top. When used in a toaster cooking appliance, heating elements 150 may be positioned on each side of a cooking cavity 104 for toasting the sides of a slice of toast. The optimized heating surface area $HS_A$ of the heating element 150 reduces energy waste by limiting heat from being applied to spaces in the cooking cavity 104 that are not proximate to a food item such as a slice of toast.

Figure 11:
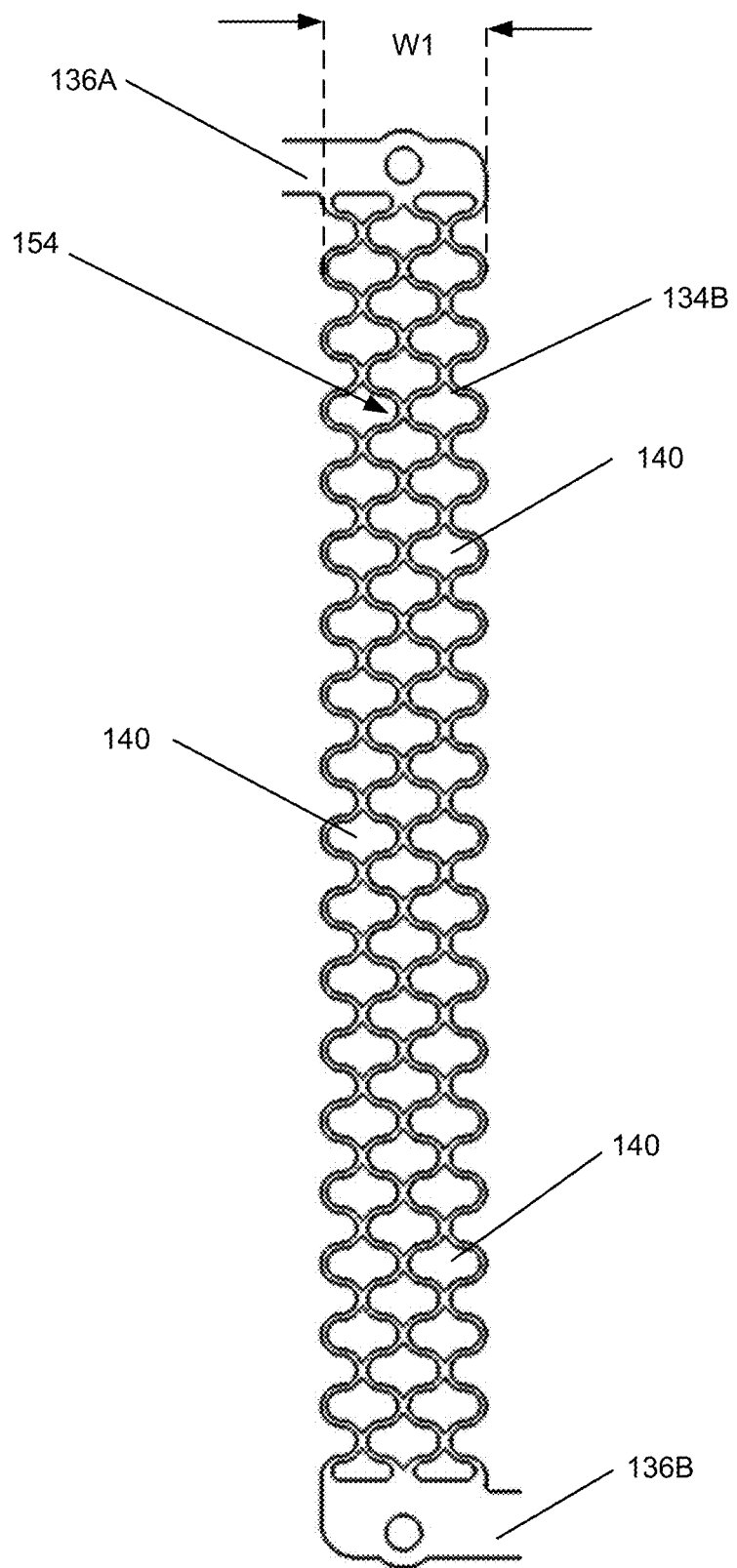
FIG. 11 is an enlarged view of the example heating element shown in FIG. 5.

Referring now to FIG. 11, an enlarged view of the heating element 150 is depicted showing the heating element segment 134B extending between the bus 136A and the bus 136B. Each heating element segment 134A-F has a repeating pattern 154 formed from a plurality of cutouts 140. The cutouts 140 are spaced apart from one another in the repeating pattern 154, and are surround by rounded corners. In some examples, the repeating pattern 154 is formed of two columns of cutouts 140 and a nested third column of cutouts 140 that overlaps and/or is arranged between the first two columns of cutouts 140. The repeating pattern 154 may allow the heating element 150 to provide a uniform radiant heating.

Figure 12:
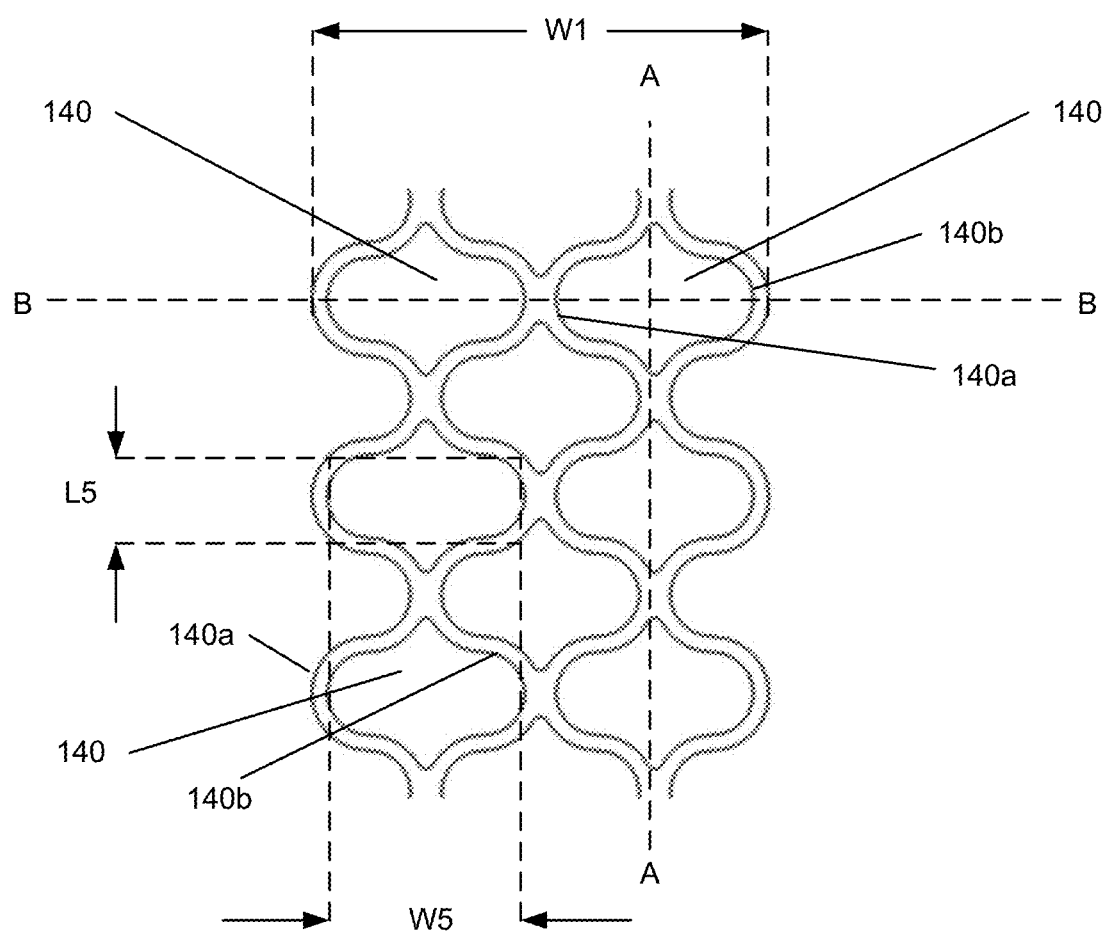
FIG. 12 is another enlarged view of the example heating element shown in FIG. 5.

Referring now to FIG. 12, the cutouts 140 have an elliptical shape such that they are substantially oval or circular. For example, each cutout 140 includes first and second walls 140a, 140b that are curved and that flare out in opposing directions along a vertical axis A-A. In this manner, each cutout 140 is separated along the vertical axis A-A from another cutout 140. Additionally, each cutout 140 is linked to an opposing wall 140a, 140b of an adjacent cutout 140. Each cutout 140 is symmetrical about both the vertical axis A-A and the horizontal axis B-B.

The curved shape of the cutouts 140 increases the current path between the terminals 130A, 130B of the heating element 150 so that higher voltages may be employed and/or a lower current may be used to heat the heating element 150. Additionally, the shape of the cutouts 140 provides a complex resistance path that may help reduce hot spots in the heating element 150.

As depicted in FIG. 12, the cutouts 140 may each have an individual width W5 and an individual length L5. In certain examples, the width W5 may range from about 0.20 inches to about 0.35 inches, and the length L5 may range from about 0.06 inches to about 0.16 inches.

In certain examples, the heating element 150 is a single sheet of material such that the terminals 130 (including terminals 130A and 130B), heating element segments 134 (including segments 134A-F), and buses 136 (including buses 136A-E) are all continuous with one another. Accordingly, separate elements or pieces are not used for connecting the terminals 130, heating element segments 134, and buses 136 since they are all part of the same continuous sheet of material. In certain examples, the heating element 150 is a single sheet of Iron-Chrome-Aluminum alloy or similar alloy material. In other examples, the heating element 150 is a single sheet of an alloy of at least nickel and chromium, known as Nichrome.

To form the terminals 130, heating element segments 134, and buses 136 as a single piece of material, a blank sheet is cut from a roll of material and is then processed. In certain examples, the blank sheet is processed using photolithography to remove unwanted portions of the sheet through an etching process, leaving only the desired features of the heating element 150. In certain examples, the photolithography process includes the steps of applying a photoresist material onto a surface of the blank sheet, aligning a photomask having an inverse pattern to that of the desired heating element 150 with the sheet and the photoresist, exposing the photoresist to ultraviolet light through the photomask, and removing the portions of the photoresist exposed to ultraviolet light. Etching is then performed to remove those portions of the sheet of material that are not protected by the remaining photoresist. The remaining photoresist is then removed leaving the heating element 150 shown in FIGS. 6 and 7. In certain examples, the sheet of conductive material is etched from both sides simultaneously due to the sheet of material not being attached to a substrate during the photolithography process.

The photolithography process optimizes the structure of the heating element 150 by imparting a continuous and smooth transition between the terminals 130, heating element segments 134, and buses 136 which are all part of the same continuous sheet of material. This improves the current flow through the heating element 150, and accordingly, improves the performance of the heating element 150 so that the infrared radiation generated by heating element 150 reaches higher temperatures in less time.

In another possible example, other techniques such as machining and/or punching are done to process the blank sheet of material to form the terminals 130, heating element segments 134, and buses 136 as a continuous single sheet of material. For example, machining or cutting can be performed by a computer numerical control (CNC) router or similar machine.

By forming the terminals 130, heating element segments 134, and buses 136 all from a single sheet of material, the heating element 150 does not have any joints where two separate pieces of metal need to be fastened together. This is advantageous for several reasons. One benefit is that joints in a heating element are a potential source of failure because the joint can oxidize over time with the exposure to electricity and oxygen. Oxidation reduces the conductivity at that point, reducing the amount of current that can flow and creating a cold spot. Eliminating the joints therefore improves the operation and reduces the chance of undesirable oxidation occurring in the heating element 150. Another benefit is that the components (terminals, heating element segments, and buses) are all connected together to begin with, and therefore no manufacturing steps are required in order to connect these components together.

After the blank sheet of conductive material has been processed, the finished heating element 150 may have a thickness T1 (depicted in FIG. 7). The thickness T1 can be selected for the heating element 150 to have a desired power output, current flow, and resistance. In certain examples, the thickness T1 is in a range from about ⅛ mm to about ⅜ mm, or about ¼ mm. In certain examples, the dimensions and material of the finished heating element 150 enable the heating element 150 to receive about 55V and to produce about 350 W+/−10% of energy.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A heating element for a cooking appliance, the heating element comprising:
    a plurality of heating element segments, each heating element segment extending between first and second terminal ends and defining a sheet having a plurality of cutouts and first and second opposed sides; and
    a reflector extending across the second sides of the plurality of heating element segments, the plurality of heating element segments being mechanically supported to the reflector by mechanical supports that allow the heating element segments to thermally expand and contract;
    wherein the plurality of heating element segments have their respective first sides exposed for emitting infrared radiation toward a cooking cavity of the cooking appliance.

2. The heating element of claim 1, wherein the reflector is a planar sheet.

3. The heating element of claim 1, wherein the reflector is electrically and thermally insulating.

4. The heating element of claim 1, wherein the reflector is arranged to reflect the infrared radiation emitted by the plurality of heating element segments toward the plurality of heating element segments.

5. The heating element of claim 1, wherein each heating element segment is attached to the reflector by a mechanical support engaged with a respective opening at opposite ends of the heating element segment.

6. The heating element of claim 1, wherein the sheet defined by each of the plurality of heating element segments has a length and a width where the length is larger than the width, and wherein the plurality of heating element segments are arranged parallel to each other with the length of each of the plurality of heating element segments extending in a same direction.

7. The heating element of claim 1, wherein each heating element segment has a width, and wherein the heating element has a total width greater than a sum of the widths of the plurality of heating element segments.

8. The heating element of claim 7, wherein the total width of the heating element is 35% to 45% greater than the sum of the widths of the plurality of heating element segments.

9. The heating element of claim 1, wherein the heating element generates the infrared radiation when an AC voltage is applied across the heating element.

10. The heating element of claim 1, further comprising one or more buses arranged between the first and second terminal ends of adjacent heating element segments, the one or more buses connecting the plurality of heating element segments in a zig-zag configuration.

11. The heating element of claim 1, wherein terminal ends of adjacent heating element segments are electrically and mechanically connected by a bus.

12. The heating element of claim 1, wherein the reflector has a flat surface that extends across the second sides of the plurality of heating element segments.

13. A heating element for a cooking appliance, the heating element comprising:
    a plurality of heating element segments, each heating element segment extending between first and second terminal ends and defining a sheet having a plurality of cutouts and first and second opposed sides, wherein the terminal ends of adjacent heating element segments are electrically and mechanically connected by a bus; and
    a reflector extending across the second sides of the plurality of heating element segments, the plurality of heating element segments being attached to the reflector by a fastener engaged with an opening in a respective bus;
    wherein the plurality of heating element segments have their respective first sides exposed for emitting infrared radiation toward a cooking cavity of the cooking appliance.

14. The heating element of claim 13, wherein the reflector is a planar sheet.

15. The heating element of claim 13, wherein the reflector is electrically and thermally insulating.

16. The heating element of claim 13, wherein the reflector is arranged to reflect the infrared radiation emitted by the plurality of heating element segments toward the plurality of heating element segments.

17. The heating element of claim 13, wherein the heating element generates the infrared radiation when an AC voltage is applied across the heating element.

18. The heating element of claim 13, wherein the reflector has a flat surface that extends across the second sides of the plurality of heating element segments.

19. A cooking appliance comprising:
    a housing defining a cooking cavity for receiving food therein; and
    a heating assembly arranged to provide infrared radiation into the cooking cavity, the heating assembly including at least one heating element that includes:
        a plurality of heating element segments, each heating element segment extending between first and second terminal ends and defining a sheet having a plurality of cutouts and first and second opposed sides; and
        a reflector supporting the plurality of heating element segments, the reflector extending across a second side of the plurality of heating element segments;
    wherein the plurality of heating element have their respective first sides exposed to the cooking cavity to emit infrared radiation toward the cooking cavity, and
    wherein the plurality of heating element segments are mechanically supported to the reflector by electrically insulated mechanical supports that allow the heating element segments to thermally expand and contract.

20. The cooking appliance of claim 19, wherein the housing includes an opening into which food is insertable into the cooking cavity in an insertion direction, each heating element segment having a width and a length that is larger than the width, and each of the plurality of heating element segments extending lengthwise in a direction along the insertion direction.

21. The cooking appliance of claim 19, wherein the cooking appliance is a toaster having parallel cooking cavities; and the cooking appliance further comprises heating assemblies mounted adjacent to opposing sides in each cooking cavity.

22. The cooking appliance of claim 19, wherein the reflector is a planar sheet.

23. The cooking appliance of claim 19, wherein the reflector is electrically and thermally insulating.

24. The cooking appliance of claim 19, wherein the reflector is arranged to reflect the infrared radiation emitted by the plurality of heating element segments toward the plurality of heating element segments and toward the cooking cavity.

25. The cooking appliance of claim 19, wherein each heating element segment is attached to the reflector by the insulated mechanical supports engaged with a respective opening at opposite ends of the heating element segment.

26. The cooking appliance of claim 19, wherein the reflector has a flat surface that extends across the second sides of the plurality of heating element segments.

* * * * *